(12) United States Patent
Mi (10) Patent No.: US 8,602,629 B2
(45) Date of Patent: Dec. 10, 2013

(54) LIGHT GUIDE PLATE HAVING A PSEUDO TWO-DIMENSIONAL PATTERN

(75) Inventor: Xiang-Dong Mi, Northborough, MA (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 226 days.

(21) Appl. No.: 13/328,342

(22) Filed: Dec. 16, 2011

(65) Prior Publication Data

US 2013/0155693 A1 Jun. 20, 2013

(51) Int. Cl.
*F21V 7/04* (2006.01)

(52) U.S. Cl.
USPC ............ 362/616; 362/619; 362/627; 362/330

(58) Field of Classification Search
None
See application file for complete search history.

(56) References Cited

U.S. PATENT DOCUMENTS

| | | | |
|---|---|---|---|
| 2005/0041177 A1* | 2/2005 | Watanabe | 349/64 |
| 2009/0257001 A1* | 10/2009 | Sumida et al. | 362/616 |
| 2009/0296019 A1* | 12/2009 | Lee et al. | 349/62 |

* cited by examiner

*Primary Examiner* — Britt D Hanley
(74) *Attorney, Agent, or Firm* — Edwin Oh (57) ABSTRACT

The present invention provides a light guide plate comprising a light guide plate comprising an input surface for receiving light from a plurality of discrete light sources, an output surface for emitting light, and a bottom surface opposing to the output surface. At least one of the output surface and the bottom surface has a micro-pattern, the micro-pattern comprising micro-lenses distributed in a first direction y-axis that is parallel to the length direction and in a second direction x-axis that is parallel to the width direction.

5 Claims, 8 Drawing Sheets

LIGHT GUIDE PLATE HAVING A PSEUDO TWO-DIMENSIONAL PATTERN

FIELD OF THE INVENTION

This invention generally relates to a light guide plate, and more particularly, relates to a light guide plate having a two-dimensional micro-pattern to improve the overall luminance uniformity of the backlight.

BACKGROUND OF THE INVENTION

Liquid crystal displays (LCDs) continue to improve in cost and performance, becoming a preferred display type for many computer, instrumentation, and entertainment applications. Typical LCD-based mobile phones, notebooks, and monitors include a light guide plate (LGP) for receiving light from a light source and redistributing the light uniformly across the light output surface of the LGP. The light source, conventionally being a long, linear cold-cathode fluorescent lamp, has evolved to a plurality of discrete light sources such as light emitting diodes (LEDs). In order to achieve increased luminance uniformity in an LED backlight, the luminance variation near the corners and sides of the light guide plate needs to be addressed.

Some LGPs have been proposed to suppress luminance variation near the corners by increasing density of the light reflection or extraction features near the corners, but few if any, also suppress the luminance variation near the sides of the LGPs. Those LGPs suppressing luminance variation near the corners typically have two or more sets of dots of different sizes, such as disclosed in U.S. Pat. No. 7,478,942 (Kim et al).

While the prior art LGPs are capable of suppressing luminance variation near the corners to a certain degree, they are still not satisfactory due to the complexity in the manufacture of those LGPs. Thus, there remains a need for an LGP that can be easily manufactured and is capable of suppressing luminance variation near the corners and sides of the LGP.

SUMMARY OF THE INVENTION

The present invention provides a light guide plate comprising: an input surface for receiving light from a plurality of discrete light sources, an output surface for emitting light, and a bottom surface opposing to the output surface, wherein at least one of the output surface and the bottom surface has a micro-pattern, the micro-pattern comprising micro-lenses distributed in a first direction y-axis that is parallel to the length direction and in a second direction x-axis that is parallel to the width direction; and wherein the micro-lenses have an area density function $D_I(y)$ that varies only with y in a first region, an area density function $D_{II}(y)$ that varies only with y in a second region, and an area density function $D_{III}(x, y)$ that varies with both x and y in a third region, area density functions $D_I(y)$, $D_{II}(y)$ having minimum values $D_{Imin}$, $D_{IImin}$ at a first same y value and maximum values $D_{Imax}$, $D_{IImax}$ at a second same y value, respectively; wherein $1.08 \leq D_{IImin}/D_{Imin} \geq 1.02$, $D_{IImax}/D_{Imax} \geq 1.20$, and $D_{II}(y) > D_{III}(x, y) > D_I(y)$ for a given x.

DETAILED DESCRIPTION OF THE INVENTION

Figure 1:
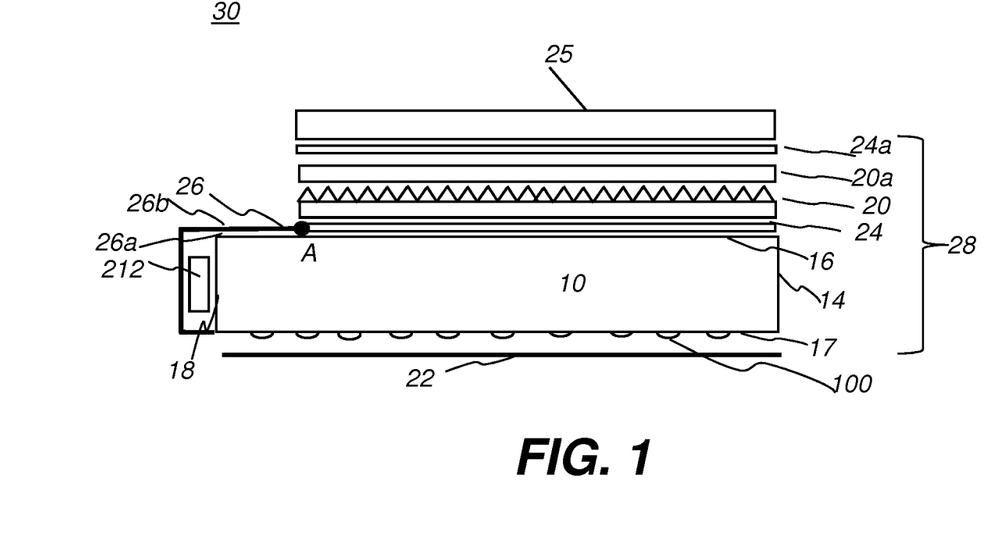
FIG. 1 shows a side view of a typical LCD comprising a plurality of optical components including a light guide plate of the present invention.

FIG. 1 shows schematically a side view of an LCD display apparatus 30 comprising an LCD panel 25 and a backlight unit 28. Backlight unit 28 comprises a plurality of optical components including one or two prismatic films 20, 20a, one or two diffusive films 24, 24a, a bottom reflective film 22, a top reflective film 26, and a light guide plate (LGP) 10. LGP 10 is different from the other optical components in that it receives the light emitted from one or more light sources 212 through its input surface 18, it redirects the light emitted through its bottom surface 17, end surface 14, output surface 16, side surfaces 15a, 15b (not shown) and reflective film 22, and eventually provides light relatively uniform to the other optical components. Targeted luminance uniformity is achieved by controlling the density, size, and/or orientation of the micro-lenses 100 (sometimes referred to as discrete elements, or light extractors) on the bottom surface 17 and/or output surface 16. The top reflective film 26 typically covers the LGP 10 for about 2 to 5 millimeters from the light input surface to allow improved mixing of light. The top reflective film 26 has a highly reflective inner surface 26a. Top reflective film 26 may have a black outer surface 26b, and is therefore referred to as "black tape". Typically the luminance of a backlight is evaluated from point A, which is at the end of top reflective film 26 and proceeds through the viewing area to the end of the LGP.

LGP 10 according to the present invention has a two-dimensional micro-pattern, which optionally consists of a plurality of substantially identical micro-lenses 100, and the density of the micro-lenses generally varies in two dimensions. In the following, "substantially identical micro-lenses" and density of the micro-lenses are described.

While no two micro-lenses are perfectly identical, micro-lenses are considered to be "substantially identical" if they have the same shape and the same orientation. More specifically, the variation of their length, width, and depth is preferably within +/−3 micrometers (μm) (or 5.4% for a 56 μm sized micro-lens), and more preferably within +/−1 μm (or 1.8% for a 56 μm size micro-lens); and the variation of their orientation angle is preferably within +/−5 degrees, and more preferably within +/−2 degrees.

Figure 2A:
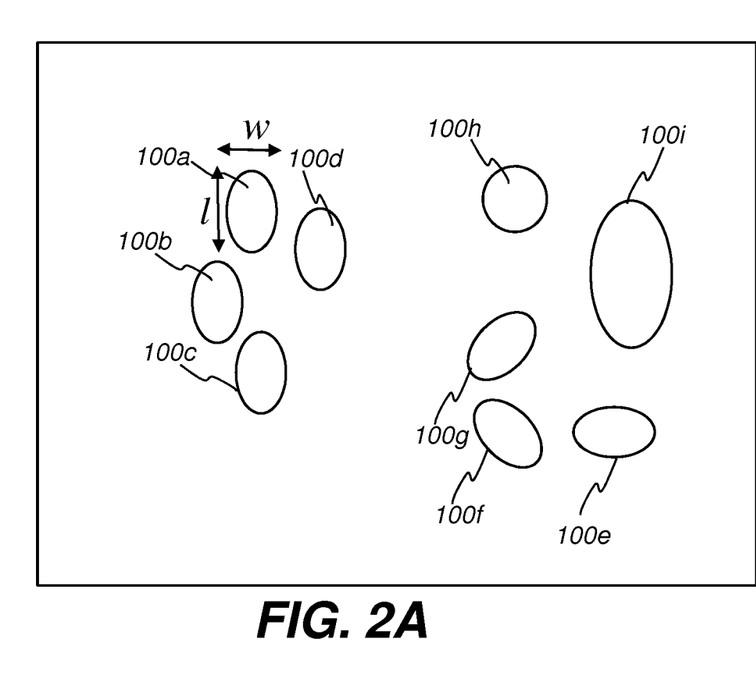
FIG. 2A shows a number of micro-lenses, some of which are substantially identical and useful for the present invention.

Referring now to FIG. 2A, micro-lenses 100a, 100b, 100c, 100d are considered to be substantially identical because they all have the same shape and the same orientation. They have the same shape because they have the same width w, length l, and depth (not shown). Micro-lenses 100e, 100f, 100g are not substantially identical to micro-lens 100a because they have a different orientation than micro-lens 100a even though they have the same shape as micro-lens 100a. Micro-lens 100h is not substantially identical to micro-lens 100a because it is circular in shape while micro-lens 100a is elliptical in shape. Micro-lens 100i is not substantially identical to micro-lens 100a because it is substantially larger than micro-lens 100a even though they both are elliptical in shape.

"Substantially identical" micro-lenses are made by the same process from substantially identical tools. The tools are considered to be substantially identical if they are made by the same process with the same target size and shape, or they differ from each other only by normal tool wear.

The advantage of using substantially identical micro-lenses is that they are easy to make because only one tool or multiple identical tools are needed. As a comparison, when two or more sets of micro-lenses with different sizes are used on a LGP, two or more sets of tools are needed, or different manufacturing processes are needed. However, the LGP according to the present invention can also use micro-lenses of different sizes.

Figure 2B:
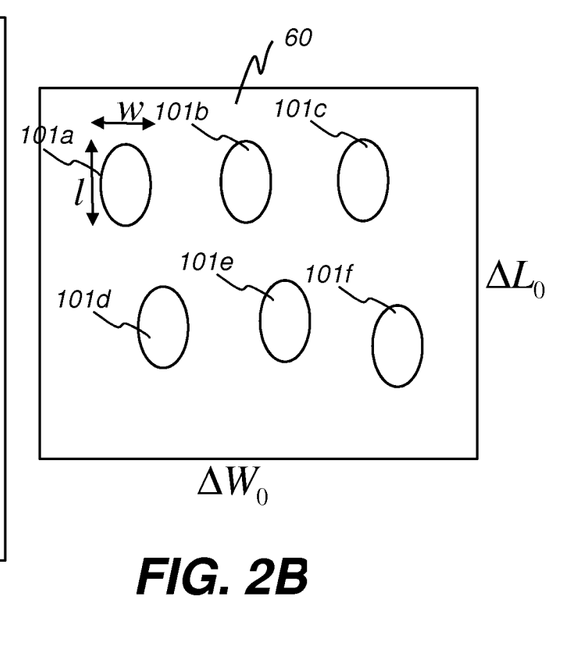
FIG. 2B shows a number of micro-lenses, explaining the area density.

The number density (ND) is defined as the number of micro-lenses per unit area, and the area density (D) is defined as the total area of micro-lenses per unit area, where unit area is typically chosen in the order of 0.5-1.5 mm² for practical use. Referring to FIG. 2B, unit area 60 is defined by a width $\Delta W_0$ and a length $\Delta L_0$. Unit area 60 contains six micro-lenses 101a-101f, each having a width $w_0$ and a length $l_0$. The number density ND equals $6/(\Delta W_0 \Delta L_0)$, while the area density D equals $6(w_0 l_0)/(\Delta W_0 \Delta L_0)$. The number density may be a fractional number when one or more lenses cross the boundary of the chosen unit area. In the following, the two-dimensional or one-dimensional density refers to the area density D of the micro-lenses. Also, density and density function will be used interchangeably.

Figure 3A:
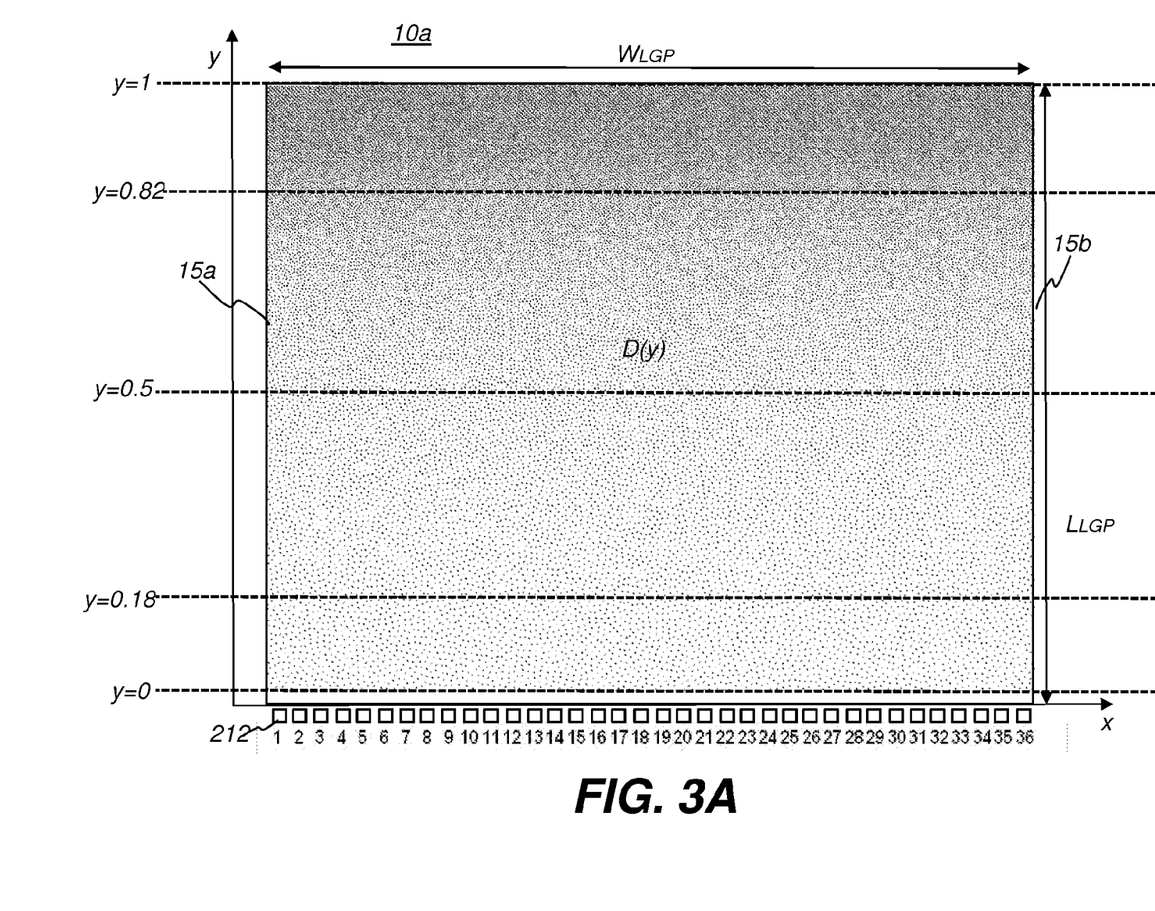
FIG. 3A shows a top view of a light guide plate having a one-dimensional density function according to a comparative example.
Figure 3B:
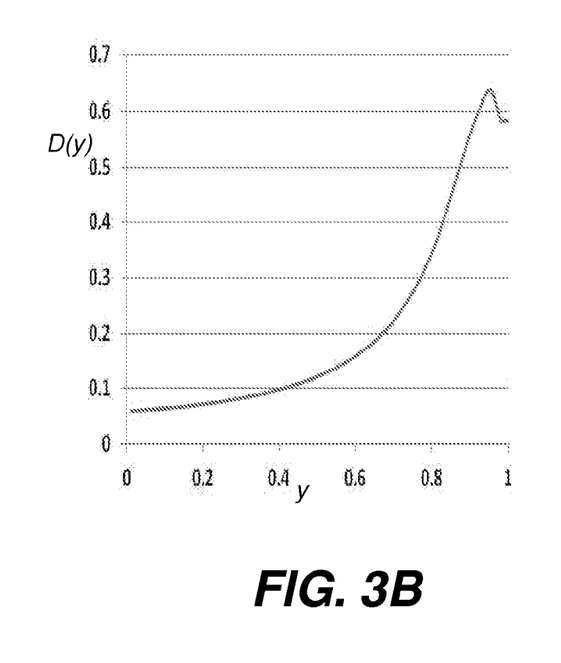
FIG. 3B shows the density function in the y-axis implemented on the light guide plate shown in FIG. 3A.
Figure 3C:
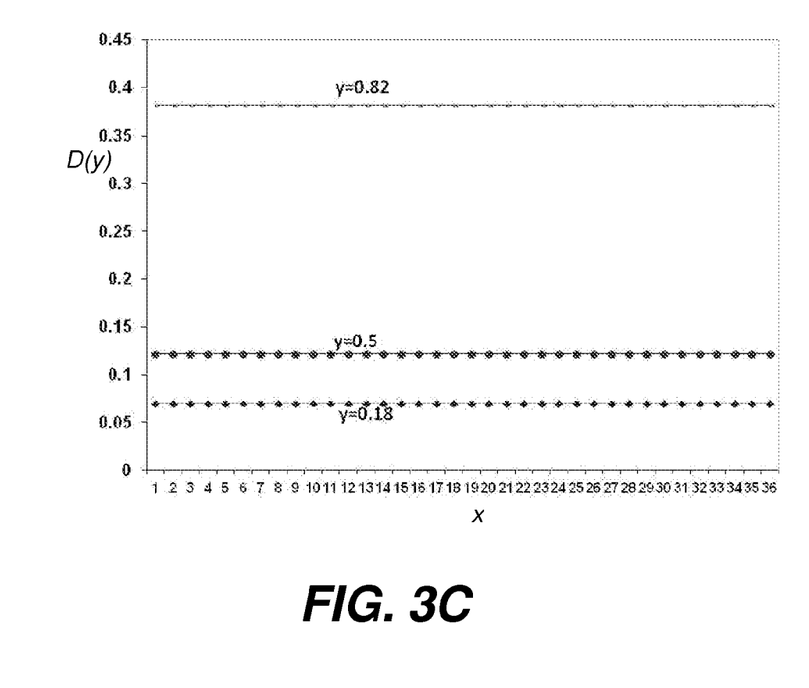
FIG. 3C shows the density function in the x-axis implemented on the light guide plate shown in FIG. 3A.

FIG. 3A shows a top view of LGP 10a having a one-dimensional density function according to a comparative example. LGP 10a accepts light emitted from discrete light sources 212. Specifically, light sources 212 are 36 LEDs. LGP 10a, having a width $W_{LGP}$, where $W_{LGP}$ is approximately 160 millimeters (mm) and a length $L_{LGP}$, where $L_{LGP}$ is approximately 200 mm, and has a micro-pattern on its bottom surface 17. The width direction is parallel to the light sources 212, while the length direction is perpendicular to the light sources 212. The micro-pattern comprises micro-lenses having a one-dimensional density function D(y) that varies with y but not with x, where the x-axis is parallel to the width direction and the y-axis is parallel to the length direction. The value of y=0 corresponds to the beginning of the micro-pattern, while y=1 corresponds to the end of the micro-pattern. The density function D(y) remains the same from side surface 15a to side surface 15b for the same y. Density function D(y) is plotted in FIGS. 3B and 3C along different directions. In FIG. 3B, density function D(y) is plotted as a function of y. In FIG. 3C, density function D(y) is plotted as a function of x, in terms of the position of each of the 36 LEDs, at y=0.18, y=0.5, and y=0.82.

Figure 3D:
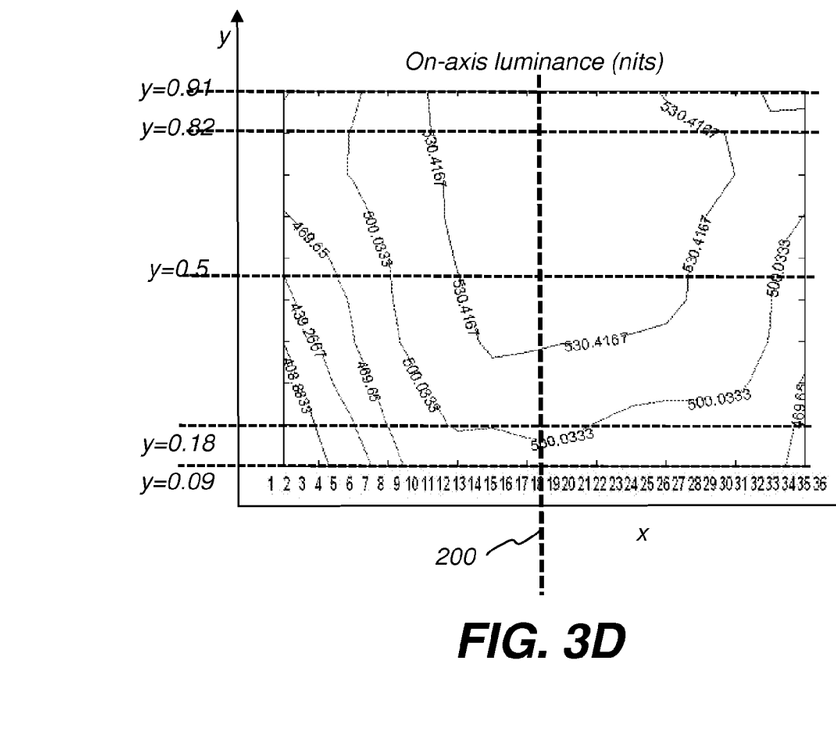
FIG. 3D shows an isoline plot of on-axis luminance measured from the light guide plate shown in FIG. 3A.
Figure 3E:
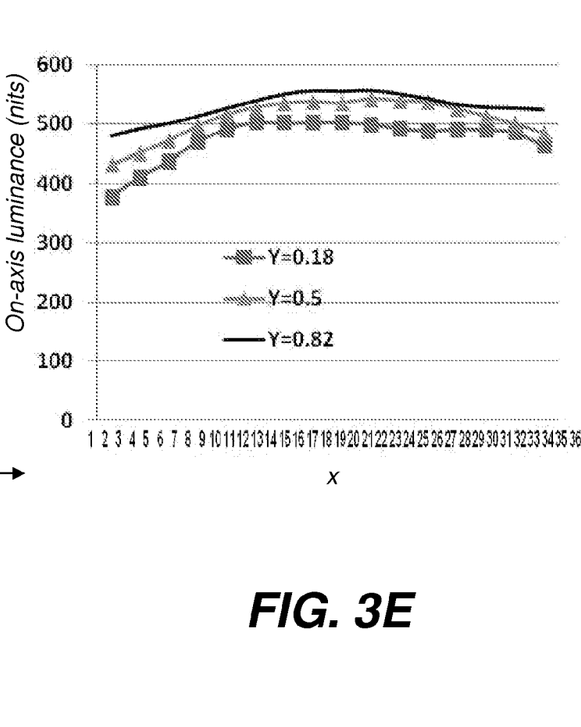
FIG. 3E shows luminance plots in the x-axis obtained from FIG. 3D.

FIG. 3D shows an isoline plot of on-axis luminance measured between y=0.09 and y=0.91 as defined according to FIG. 3A. It shows a large variation along the three horizontal lines corresponding to y=0.18, y=0.5, and y=0.82. The details of the luminance at each of the three horizontal lines are shown in FIG. 3E, in which on-axis luminance is plotted as a function of x expressed in terms of the position of each of the 36 LEDs. It is clearly seen that the luminance level near the two side surfaces is lower than that in the center. More specifically, the ratio between the minimal and maximal luminance values is only about 75% at y=0.18. This ratio limits the maximum uniformity that LGP 10a can achieve.

Ideally, the isoline plot of the on-axis luminance shown in FIG. 3D should be symmetrical about center line 200. However, due to the inherent variability in the fabrication process for the LGP, it is common to observe such an asymmetrical luminance distribution.

Figure 4A:
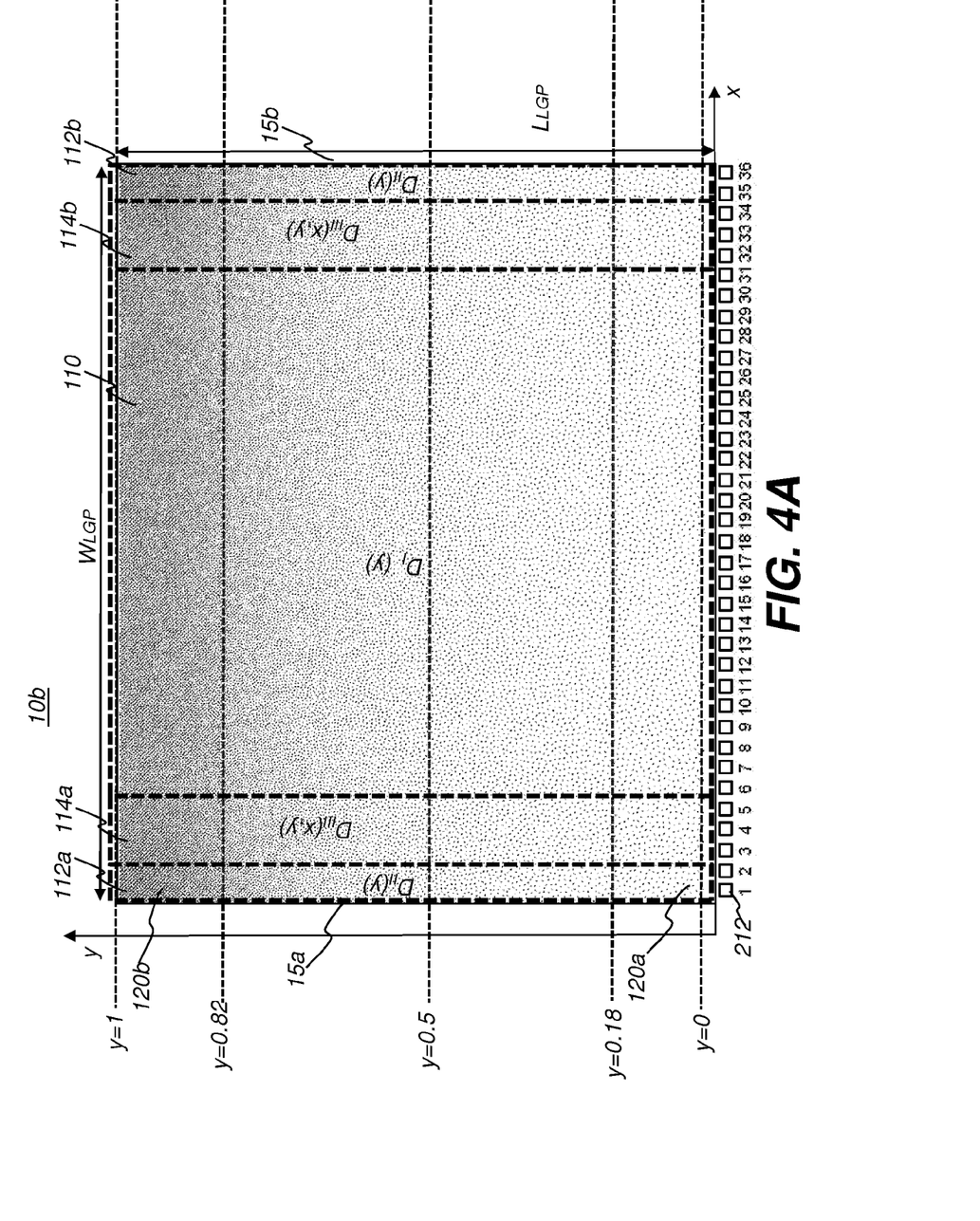
FIG. 4A shows a top view of a light guide plate having a pseudo two-dimensional density function according to the present invention.

FIG. 4A shows a top view of LGP 10b having a pseudo two-dimensional density function according to the present invention. LGP 10b has the same width $W_{LGP}$ and length $L_{LGP}$ as LGP 10a, and accepts light from the same thirty-six light sources 212. However, the micro-pattern on the bottom surface 17 of LGP 10b comprises micro-lenses having a pseudo two-dimensional density function. The pseudo two-dimensional density function comprises three density functions, $D_I(y)$, $D_{II}(y)$, and $D_{III}(x,y)$ in three respective regions. Density function $D_I(y)$ is one-dimensional and distributed in a first region 110, which is located in the central portion of LGP 10b along the x-axis. Density function $D_{II}(y)$ is one-dimensional and distributed in a second region which includes two sub-regions 112a, 112b, which are located near the two side surfaces 15a, 15b of LGP 10b. Density function $D_{III}(x, y)$ is two-dimensional and distributed in a third region which includes two sub-regions 114a, 114b. Sub-regions 114a and 114b are located between sub-region 112a and region 110 and between sub-regions 112b and region 110, respectively.

Density function $D_{II}(y)$ is always greater than $D_I(y)$ for the same y value. Additionally, $D_{II}(y)$ and $D_I(y)$ have minimum values, $D_{Imin}$ and $D_{IImin}$ at a same first y value and maximum values $D_{Imax}$ and $D_{IImax}$ at a same second y value, respectively. Moreover, the ratio $D_{IImin}/D_{Imin}$ and $D_{IImax}/D_{Imax}$ must satisfy the following conditions:

$$1.08 \geq D_{IImin}/D_{Imin} \geq 1.02, \text{ and}$$

$$D_{IImax}/D_{Imax} \geq 1.20.$$

Furthermore, for any given x, $D_{II}(y) > D_{III}(x, y) > D_I(y)$.

If $D_{IImin}/D_{Imin}$ is less than 1.02, the luminance at the corners 120 will still be too low. However, if $D_{IImin}/D_{Imin}$ is greater than 1.08, the luminance near some portion of side surface 15a and at corner 120b will still be too low no matter how high $D_{IImax}$ is because $D_{IImax}$ cannot exceed 1.00.

Figure 4B:
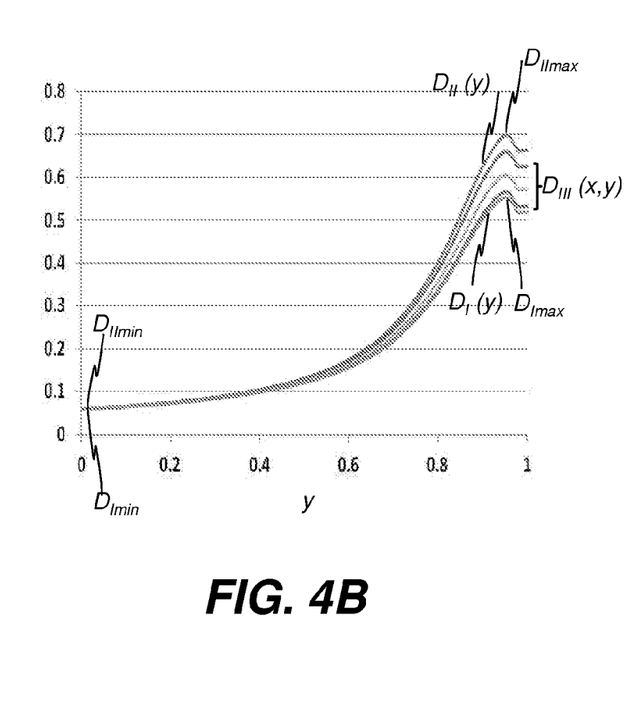
FIG. 4B shows the density function in the y-axis implemented on the light guide plate shown in FIG. 4A.

FIG. 4B shows density functions $D_I(y)$, $D_{II}(y)$, $D_{III}(x, y)$ along the y-axis. According to one inventive example, at the same y=0.95, $D_I(y)$ and $D_{II}(y)$ have maximal values $D_{Imax}=0.553$, and $D_{IImax}=0.697$, respectively. At the same y=0.01, $D_I(y)$ and $D_{II}(y)$ have minimal values $D_{Imin}=0.058$, and $D_{IImin}=0.060$, respectively. Thus, $D_{IImin}/D_{Imin}=1.034$, and $D_{IImax}/D_{Imax}=1.26$. $D_{III}(x,y)$ also has a maximum value at y=0.95 and a minimum value at y=0.1 for a given x.

Figure 4C:
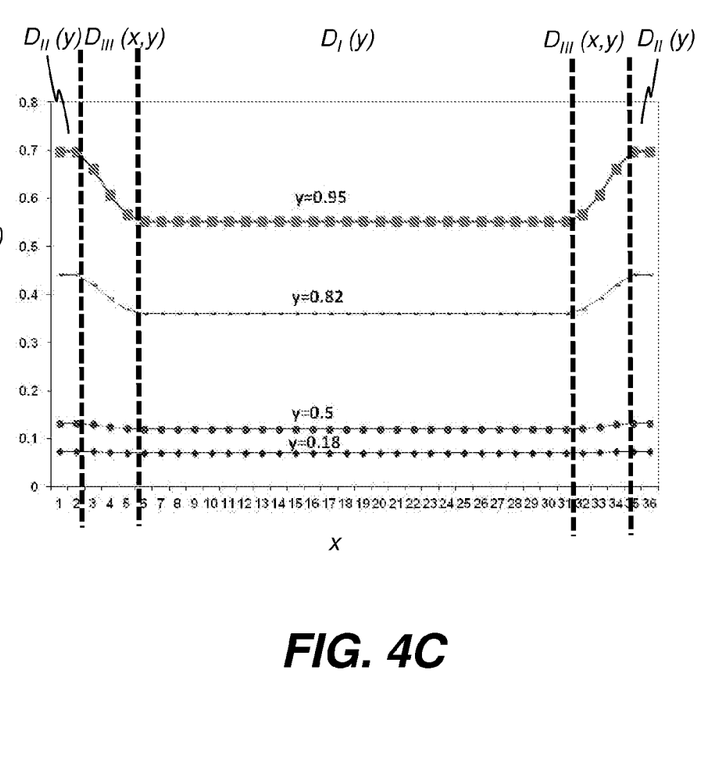
FIG. 4C shows the density function in the x-axis implemented on the light guide plate shown in FIG. 4A.

FIG. 4C shows density functions $D_I(y)$, $D_{II}(y)$, $D_{III}(x,y)$ along the x-axis expressed in terms of the position of each of the 36 light sources according to the same inventive example. Four density curves are plotted corresponding to y=0.18, y=0.5, 0.82, and 0.95. In this example, the ratio of the area of the first region having density function $D_I(y)$ to the micro-patterned area of that same region is about 72%, the ratio of the area of the second region having density function $D_{II}(y)$ to the micro-patterned area of that same region is about 11% (including the two sub-regions), and the ratio of the area of the third region having density function $D_{III}(x, y)$ to the micro-patterned area of that same region is about 17% (including the two sub-regions).

Figure 4D:
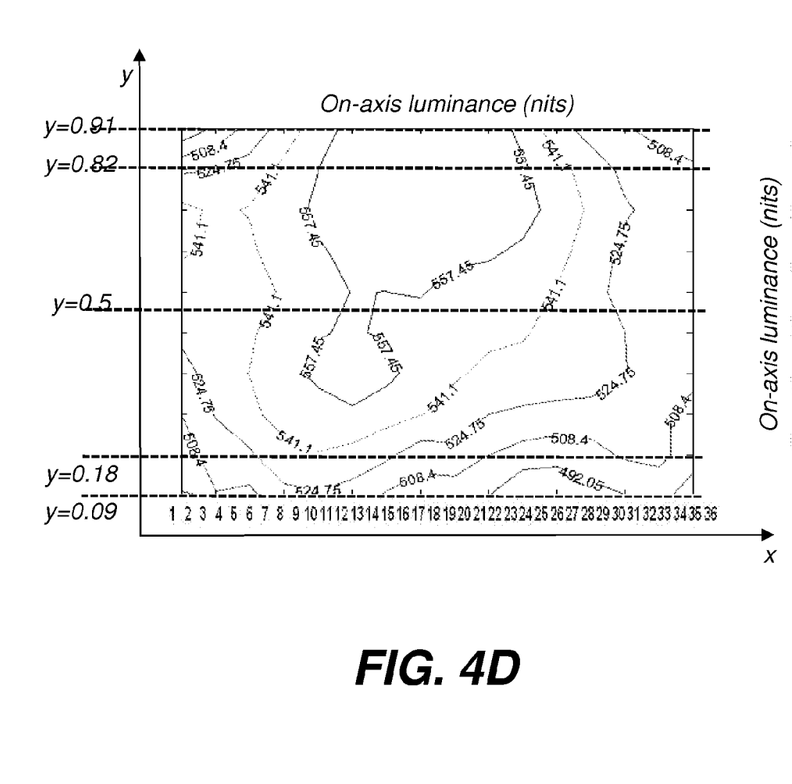
FIG. 4D shows an isoline plot of on-axis luminance measured from the light guide plate shown in FIG. 4A; and, FIG. 4E shows luminance plots in the x-axis obtained from FIG. 4D.
Figure 4E:
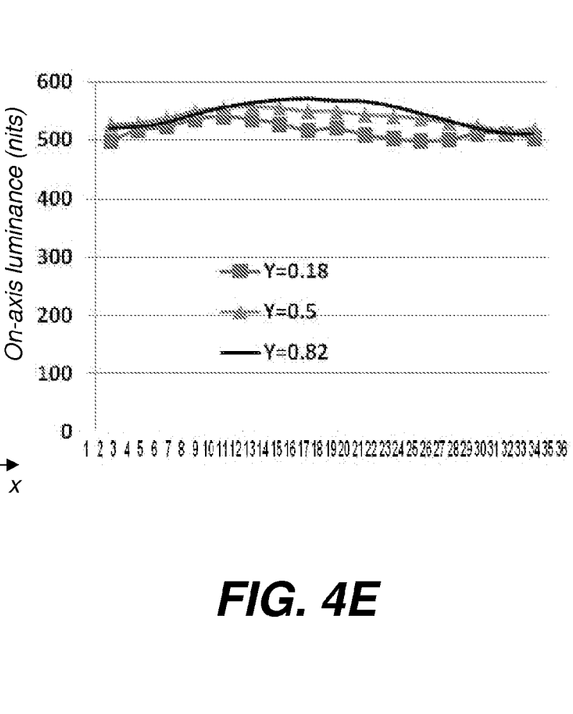

FIG. 4D shows an isoline plot of the on-axis luminance measured from the inventive LGP 10b. Compared to the isoline plot of the measured on-axis luminance from comparative LGP 10a as shown in FIG. 3D, the variation along the three horizontal lines corresponding to y=0.18, y=0.5 and y=0.82 is much smaller. FIG. 4E shows a plot of on-axis luminance as a function of x expressed in terms of the position of each of the 36 LEDs. The comparison between FIG. 4E for the inventive LGP 10b and FIG. 3E for the comparative LGP 10a clearly shows a smaller luminance variation when the measured points move between the two side surfaces. Specifically, according to the inventive LGP 10b, the ratios between the minimal and maximal luminance values are about 92%, 92%, and 89% for y=0.18, y=0.5 and y=0.82 respectively. In contrast, according to the comparative LGP 10a, the ratios between the minimal and maximal luminance values are about 75%, 80% and 86% for y=0.18, y=0.5 and y=0.82 respectively.

It should be emphasized that the micro-lenses on LGP 10b of the present invention are preferred to be substantially identical as discussed above. However, the micro-lenses on LGP 10b can also have different sizes and orientation angles.

Even though in the above inventive example, the ratios of the areas of the first region, the second region, and the third region having density functions $D_I(y)$, $D_{II}(y)$, $D_{III}(x,y)$ over the area of the micro-patterned area are about 72%, 11%, and 17%, respectively, it should be understood that those ratios can be in a broader range for LGPs having different widths and lengths. Specifically, the ratio of the area of the first region having density functions $D_I(y)$ over the area of the micro-patterned area can be between 60% and 80%. The ratio of the area of the second region having density functions $D_{II}(y)$ over the area of the micro-patterned area can be between 5% and 20%. And, the ratio of the area of the third region having density functions $D_I(y)$ over the area of the micro-patterned area can be between 10% and 30%.

Many polymeric materials can be selected to practice this invention. The selected material must be sufficiently stiff and tough to minimize fracture and distortion during practical use. But most importantly, the selected material must possess high levels of transmittance over the visible range of the spectrum and low color. Materials useful in this invention include but are not limited to: Poly(methyl methacrylate) (PMMA), impact modified PMMA and other acrylic polymers, polycarbonates, poly cyclo olefins, cyclic block copolymers, polyamides, styrenics, polysulfones, polyesters, polyester-carbonates, and various miscible blends thereof.

The invention claimed is:

1. A light guide plate comprising:
    an input surface for receiving light from a plurality of discrete light sources, an output surface for emitting light, and a bottom surface opposing to the output surface,
    wherein at least one of the output surface and the bottom surface has a micro-pattern, the micro-pattern comprising micro-lenses distributed in a first direction y-axis that is parallel to the length direction and in a second direction x-axis that is parallel to the width direction; and
    wherein the micro-lenses have an area density function $D_I(y)$ that varies only with y in a first region, an area density function $D_{II}(y)$ that varies only with y in a second region, and an area density function $D_{II}(x, y)$ that varies with both x and y in a third region, area density functions $D_I(y)$, $D_{II}(y)$ having minimum values $D_{Imin}$, $D_{IImin}$ at a first same y value and maximum values $D_{Imax}$, $D_{IImax}$ at a second same y value, respectively; wherein $1.08 \geq D_{IImin}/D_{Imin} \geq 1.02$, $D_{IImax}/D_{Imax} \geq 1.20$, and $D_{II}(y) > D_{III}(x,y) > D_I(y)$ for a given x.

2. The light guide plate of claim 1, wherein the ratio of the area of the first region over the area of the micro-pattern area is between 60 to 80 percent.

3. The light guide plate of claim 1, wherein the ratio of the area of the second region over the area of the micro-pattern area is between 5 to 20 percent.

4. The light guide plate of claim 1, wherein the ratio of the area of the third region over the area of the micro-pattern area is between 10 to 30 percent.

5. The light guide plate of claim 1, wherein the variation of the width, length and depth of the plurality of micro-lenses is within 1.8 percent.

* * * * *